United States Patent
Hu et al.

(10) Patent No.: US 7,724,649 B2
(45) Date of Patent: May 25, 2010

(54) METHOD AND DEVICE FOR MAKING UPLINK STANDBY

(75) Inventors: Jiehui Hu, Shenzhen (CN); Bin Ren, Shenzhen (CN); Yu Xiong, Shenzhen (CN); Liang Cao, Shenzhen (CN); Nan Huai, Shenzhen (CN)

(73) Assignee: Huawei Technologies, Co. Ltd., Shenzhen (CN)

( * ) Notice: Subject to any disclaimer, the term of this patent is extended or adjusted under 35 U.S.C. 154(b) by 204 days.

(21) Appl. No.: 11/965,830

(22) Filed: Dec. 28, 2007

(65) Prior Publication Data
US 2008/0101362 A1   May 1, 2008

Related U.S. Application Data

(63) Continuation of application No. PCT/CN2006/002075, filed on Aug. 16, 2006.

(30) Foreign Application Priority Data
Aug. 16, 2005   (CN)   .................. 2005 1 0090798

(51) Int. Cl.
    *H04L 12/26* (2006.01)
(52) U.S. Cl. .................................................. 370/216
(58) Field of Classification Search .................. None
See application file for complete search history.

(56) References Cited

U.S. PATENT DOCUMENTS

| | | | | |
|---|---|---|---|---|
| 3,920,975 | A * | 11/1975 | Bass | 714/716 |
| 6,594,228 | B1 | 7/2003 | Naidoo et al. | 370/217 |
| 2001/0037472 | A1* | 11/2001 | Li | 714/4 |
| 2002/0186652 | A1* | 12/2002 | Popovich | 370/218 |
| 2003/0067917 | A1* | 4/2003 | Morrison et al. | 370/390 |
| 2004/0009751 | A1* | 1/2004 | Michaelis et al. | 455/62 |
| 2006/0153219 | A1* | 7/2006 | Wong et al. | 370/432 |

(Continued)

FOREIGN PATENT DOCUMENTS

CN   1253641   5/2000

(Continued)

OTHER PUBLICATIONS

International Search Report for International Application No. PCT/CN2006/002075, dated Dec. 14, 2006.

(Continued)

*Primary Examiner*—Chirag G Shah
*Assistant Examiner*—Amarnauth Persaud
(74) *Attorney, Agent, or Firm*—Conley Rose, P.C.; Grant Rodolph

(57) ABSTRACT

The embodiments of present invention disclose a method and a device for making uplink standby, including: configuring more than one uplink for an Internet Group Management Protocol (IGMP) proxy device, and choosing one of the more than one uplink as a primary uplink; the IGMP proxy device replicating a multicast packet received over the primary uplink and sending the multicast packet replicated over a downlink to a multicast host. In the method provided by the embodiments of the present invention, only the primary uplink is used, which reduces the link bandwidth waste of the multicast host and improves the multicast data transmission efficiency. Flexible methods are adopted for checking the availability of the primary uplink so that the IGMP proxy device may detect in real time whether the primary uplink is available and choose a new primary uplink in time to guarantee the normal multicast communication.

10 Claims, 2 Drawing Sheets

U.S. PATENT DOCUMENTS

2006/0176804 A1    8/2006    Shibata .................. 370/217

OTHER PUBLICATIONS

Written Opinion for International Application No. PCT/CN2006/002075, dated Dec. 14, 2006.

Jun et al., "IGMP Proxy for Multicast Services in Wireless Mobile Networks," Electronics and Telecommunications Research Institute (2005).

Fenner et al., "IGMP/MLD-Based Multicast Forwarding ("IGMP/MLD Proxying")," MAGMA Working Group, Internet Draft (2004).

Supplementary European Search Report for Application No. EP06775393, dated Jul. 2, 2008.

* cited by examiner

METHOD AND DEVICE FOR MAKING UPLINK STANDBY

CROSS-REFERENCE TO RELATED APPLICATIONS

This is a continuation of International Application No. PCT/CN2006/002075, filed Aug. 16, 2006, which claims the benefit of Chinese Patent Application No. 200510090798.4, filed Aug. 16, 2005, the entire disclosures of which are incorporated herein by reference.

FIELD OF THE INVENTION

The present invention relates to the multicast technology, and particularly, to a method and device for making uplink standby on an Internet Group Management Protocol (IGMP) proxy device.

BACKGROUND OF THE INVENTION

A multicast source or multicast router manages with the IGMP the process in which a multicast host joins or leaves a multicast group or receives a multicast packet from the multicast source or multicast router. In practical applications to networks, a multicast host is usually connected to the multicast source or multicast router through a network device instead of direct connection. The network device includes a layer-2 network device, such as a layer-2 Ethernet switch, and a layer-3 network device, such as a router. Different network devices produced by different manufacturers may or may not support a multicast routing protocol, and when a network device does not support the multicast routing protocol, multicast communication fails. In order to ensure normal multicast communication for a multicast host, i.e., ensure that the multicast host may join or leave a multicast group or receive a multicast packet from the multicast source or multicast router, IGMP proxy functions may be adopted by the network device between the multicast source or multicast router and the multicast host to support multicast applications. The network device equipped with the IGMP proxy functions is referred to as an IGMP proxy device.

An IGMP proxy device, over an uplink connected with the multicast source or multicast router, receives a multicast packet and IGMP membership query message and sends an IGMP membership report message and IGMP leave group message; over a downlink connected with the multicast host, sends a multicast packet and IGMP membership query message and receives an IGMP membership report message from the multicast host. The IGMP membership query message, IGMP membership report message and IGMP leave group message are all IGMP messages.

Since the IGMP proxy device receives the multicast packets over the uplink, replicates the multicast packet and sends the multicast packet over the downlink connected with each multicast host, the availability of the uplink between the IGMP proxy device and the multicast source or multicast router is crucial to each multicast host connected to the IGMP proxy device with respect to the normal receiving of the multicast packet.

The system administrator of the IGMP proxy device in the related art usually configures multiple uplinks to the multicast source or multicast router for the IGMP proxy device, hence even if one of the multiple uplinks fails, the IGMP proxy device may still guarantee the normal multicast communication for a multicast host. However, every uplink receives from the multicast source or multicast router the same multicast packet, and the same multicast packet is replicated and sent over the downlink to the multicast host, which results in that the multicast host receives multiple repeated multicast packets.

For example, if three uplinks, namely, Uplinks A, B and C, are configured for the IGMP proxy device, and the IGMP proxy device receives a multicast packet from the multicast source or multicast router through Uplink A, Uplink B and Uplink C respectively, the IGMP proxy device actually receives three identical multicast packets, replicates the three identical multicast packets, and sends replicated multicast packets over the downlink to the multicast host. Therefore the multicast host also receives three identical multicast packets. Such operation wastes bandwidth of the multicast host and increases system overhead of the IGMP proxy device.

SUMMARY OF THE INVENTION

Embodiments of the present invention provide a method for making uplink standby on an IGMP proxy device and an IGMP proxy device for making uplink standby so as to reduce both the bandwidth waste of a multicast host and the system overhead of the IGMP proxy device.

A method for making uplink standby, comprising:

configuring more than one uplink for an Internet Group Management Protocol (IGMP) proxy device, and choosing one of the more than one uplink as a primary uplink; replicating, by the IGMP proxy device, a multicast packet received over the primary uplink and sending the multicast packet replicated over a downlink to a multicast host.

An Internet Group Management Protocol (IGMP) proxy device for making uplink standby includes:

a first module, configured to replicate a multicast packet received over a primary uplink; wherein the primary uplink is one uplink chosen from more than one uplink configured for the IGMP proxy device;

a second module, configured to send the multicast packet replicated by the first module over a downlink to a multicast host.

In the method and device provided by the embodiments of the present invention, only the primary uplink is used at a time, therefore the bandwidth waste of the links to the multicast host is cut down, the resource consumption of the IMGP proxy device is reduced and the transmission efficiency of multicast data is improved. While checking the availability of the primary uplink, the embodiments of the present invention chooses, based on the features of multicast communication and different demands of network users, to check whether the bottom layer link of the primary uplink is unavailable, or whether the multicast data stream over the primary uplink is interrupted, or whether the IGMP membership query message is received over the primary uplink at a predetermined interval, or to check any combination of the above three items, so that the IGMP proxy device may determine in real time whether the primary uplink is available and choose a new primary uplink in time so as to guarantee the normal multicast communication.

DETAILED DESCRIPTION OF THE INVENTION

The method provided by the embodiments of the present invention for making uplink standby on the IGMP device includes: configuring more than one uplink for an Internet Group Management Protocol (IGMP) proxy device, assigning a priority level to each of the more than one uplink, determining a primary uplink according to the availabilities and priority levels of the more than one uplink and determining other uplinks as standby uplinks; periodically checking the primary uplink in use and, if the primary uplink is unavailable, choosing a new primary uplink among all standby uplinks according to the availabilities and priority levels of the standby uplinks.

The process of checking whether the primary uplink is available includes: checking whether the bottom layer link of the primary uplink is unavailable, or whether multicast data stream over the primary uplink is interrupted, or whether an IGMP membership query message is received over the primary uplink at a predetermined interval.

To enable the method provided by the embodiments of the present invention, two identification fields are added into a link control block corresponding to every uplink, namely, a priority level identification field and a primary/standby identification field. The priority level identification field is used for identifying the priority level of an uplink, and the primary/standby identification field is used for identifying that an uplink is the primary uplink or a standby uplink. The link control block is a software structure set in the IGMP proxy device for every uplink, and is used for recording link information including link bandwidth, link interface type, etc.

The method provided by the embodiments of the present invention is described hereinafter with reference to embodiments in which there is only one IGMP proxy device between a multicast host and a multicast source or a multicast router.

Two embodiments of the present invention are provided herein. In a first embodiment, the IGMP proxy device transmits an IGMP membership report message over the primary uplink only and responds to the IGMP membership query message over the primary uplink only; the IGMP proxy device also replicates only the multicast packet from the primary uplink and sends the replicated multicast packet over a downlink to the multicast host. In a second embodiment, the IGMP proxy device transmits an IGMP membership report message over both the primary uplink and the standby uplinks and responds to the IGMP membership query message over both the primary uplink and the standby uplinks; however, the IGMP proxy device replicates only the multicast packet from the primary uplink and sends the replicated multicast packet over a downlink to the multicast host, the multicast packet received from the standby uplinks are discarded.

Figure 1:
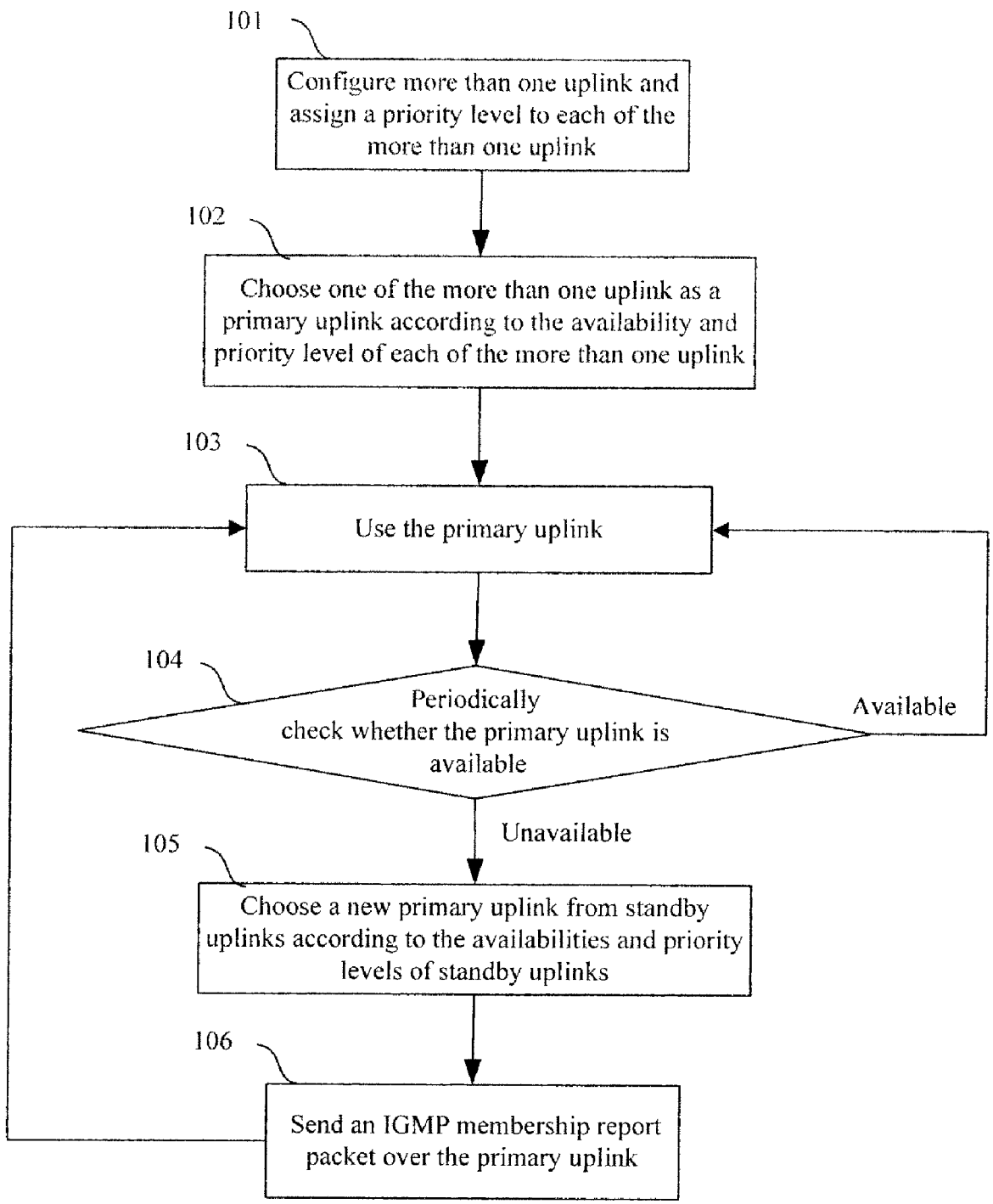
FIG. 1 shows a simplified flow chart illustrating a method for making uplink standby in accordance with an embodiment of the present invention.

FIG. 1 shows a simplified fled flow chart illustrating a method for making uplink standby in accordance with the first embodiment of the present invention, which includes as follows.

Block 101: More than one uplink is configured for the IGMP proxy device based on the network topology, and different priority levels are assigned to different uplinks, the priority level of every uplink is then recorded in the priority level identification field of the link control block corresponding to the uplink.

A priority level is assigned to an uplink according to the idle bandwidth, or interface type, or delay of the uplink, or according to the number of network devices through which the uplink is connected to the multicast source or multicast router, or according to that the uplink is a dedicated uplink or a common uplink. And in particular, a higher priority level is assigned to an uplink with broader idle bandwidth, or to an uplink with a Gigabyte Ethernet (GE) interface instead of an uplink with one 100M Ethernet interface, or to an uplink with smaller delay, or to an uplink which passes through less network devices between the IGMP proxy device and the multicast source or multicast router, or to an uplink dedicated to multicast communication instead of an uplink for multiple services.

Usually a numeral is given to an uplink to identify the priority level of the uplink, e.g., in a specified numeral scope, a unique numeral is given to an uplink to identify the priority level of the uplink, the smallest number in the numeral scope indicates the highest priority level and the biggest number in the numeral scope indicates the lowest priority level, or the biggest number in the numeral scope indicates the highest priority level and the smallest number in the numeral scope indicates the lowest priority level. The numeral scope may be determined according to the demands of practical applications, e.g., 0-255 is usually chosen in software programming. Practically, other indications may also be used for identifying the priority level, e.g., high, middle and low, or A, B, C and D.

Block 102: The IGMP proxy device checks the availabilities of all uplinks, chooses, according to the priority level identification in the link control block corresponding to every uplink, an available uplink with the highest priority level as the primary uplink, and identifies "primary" in the primary/standby identification field of the link control block corresponding to the primary uplink; other uplinks are standby uplinks and are identified "standby" in the primary/standby identification fields of the link control blocks corresponding to the standby uplinks.

The availability of an uplink is checked by determining whether the bottom layer link of the uplink is unavailable. When the bottom layer link is unavailable, it may be determined that the corresponding uplink is unavailable. If it cannot be determined that the bottom layer link is unavailable, it may be determined that the corresponding uplink is available. The unavailability of the bottom layer link is determined by determining whether the physical layer or link layer of the interface is unavailable, or by determining whether the interface administrator sets the uplink interface as unavailable or deletes the IP address of the uplink interface.

Two methods may be adopted to choose the primary uplink according to the availability and priority level of the uplink.

In the first method, a first uplink is chosen at random and the availability of the first uplink is checked through the foregoing description, if the first uplink is available, the first uplink and the priority level thereof are recorded; then a second uplink is chosen at random again and the availability of the second uplink is also checked through the foregoing description, if the second uplink is available, the priority levels of the first and the second uplinks are compared, if the priority level of the second uplink is higher than that of the first uplink, the records of the first uplink and the priority level of the first uplink are discarded and the second uplink and the priority level thereof are recorded, otherwise, the records are not updated. The availability of every uplink is thus checked by the described method and the priority level of every uplink is compared with the current recorded priority level. Finally an available uplink with the highest priority is obtained as the primary uplink and other uplinks are set as the standby uplinks.

In the second method, the availability of every uplink is checked in an order of the priority level from high to low. Once an uplink is detected as available, the uplink is set as the primary uplink and other uplinks as the standby uplinks. The availabilities of the standby uplinks are no longer checked.

Block 103: The ICGMP proxy device implements the multicast communication with the primary uplink only. Specifically, the IGMP proxy device checks the primary/standby identification field of the link control block corresponding to the uplink and thus determines that the uplink is the primary uplink or the standby uplink. The IGMP proxy device transmits the IGMP membership report message over the primary uplink only and responds to the IGMP membership query message over the primary uplink only; the IGMP proxy device also replicates only the multicast packet from the primary uplink and sends the replicated multicast packet over a downlink to a multicast host. The IGMP proxy device does not utilize the standby uplinks or send the IGMP membership report message over the standby uplinks.

Though the IGMP proxy device uses only the primary uplink in the multicast communication, the multicast source and multicast router configured by a device manufacturer or software provider usually send the IGMP membership query message and the multicast packet to all uplinks directly connected to the multicast source and multicast router. In such case, the IGMP proxy device also receives the IGMP query and the multicast packet over standby uplinks. In the embodiments of the present invention, if the IGMP proxy device determines that an uplink over which a packet is received is a standby uplink according to the primary/standby identification field of the link control block corresponding to the uplink, the IGMP proxy device gives no response to the IGMP membership query message received over the uplink and discards the multicast packet from the uplink. Practically, the IGMP proxy device does not replicate the multicast packet received over the uplink or send the replicated multicast packet to the downlink.

Block 104: When the primary uplink is in use, the IGMP proxy device periodically checks the availability of the primary uplink; if the primary uplink is detected as unavailable, Block 105 is performed; otherwise, the primary uplink is kept for communication until the next availability checking.

The interval at which the availability is checked depends on the requirements of specific hosts on network services, the QoS promised by network operators, the stability of the network links and interface types of network links. For example, when a network operator promises high QoS to network users, a short interval should be set.

The availability of the primary uplink is checked by: checking whether the bottom layer link of the primary uplink is unavailable, or checking whether the multicast data stream over the primary uplink is interrupted, or checking whether the IGMP membership query message is received over the primary uplink at a predetermined interval. The availability check is described in detail hereafter.

The method for checking whether the bottom layer link of the primary uplink is unavailable is described in Block 102. The availability of the primary uplink is thus determined by checking whether the bottom layer link of the primary uplink is unavailable.

The method for checking whether the multicast data stream over the primary uplink is interrupted includes: setting an interval on the IGMP proxy device and, if no multicast packet from the multicast hosts in the multicast host list of the IGMP proxy device is received over the primary uplink within the interval, determining that the multicast data stream over the primary uplink is interrupted and the primary uplink is unavailable; otherwise, determining that the primary uplink is available. The interval may be set based on the delay over the primary uplink and the timeout time predetermined by the IGMP proxy device for the multicast hosts.

The method for checking whether the IGMP membership query message is received over the primary uplink at a predetermined interval includes: setting an interval on the IGMP proxy device and, if no IGMP membership query message from the multicast hosts in the multicast host list of the IGMP proxy device is received over the primary uplink within the interval, determining that the primary uplink is unavailable; otherwise, determining that the primary uplink is available. The interval may be set based on the delay over the primary uplink, the timeout time predetermined by the IGMP proxy device for the multicast hosts and the timeout time predetermined on the multicast source or multicast router for the multicast hosts.

In practical applications, at least one of the three methods may be adopted based on specific network environments to check the availability of the primary uplink. For example, any one of the three methods may be adopted to check the availability of the primary uplink; or any two of the three methods may be adopted to check the availability of the primary uplink, e.g., the method of checking whether the bottom layer link of the primary uplink is unavailable and the method of checking whether the multicast data stream over the primary uplink is interrupted, and if it is determined by any of the two methods that the primary uplink is unavailable, the primary uplink is regarded as unavailable, if it cannot be determined by the two methods that the primary uplink is unavailable, the primary uplink is regarded as available; or all of the three methods may be adopted to check the availability of the primary uplink, and if it is determined by any of the three methods that the primary uplink is unavailable, the primary uplink is regarded as unavailable, if it cannot be determined by all of the methods that the primary uplink is unavailable, the primary uplink is regarded as available.

Before checking whether the multicast data stream over the primary uplink is interrupted or whether the IGMP membership query message is received over the primary uplink at a predetermined interval, the multicast host list of the IGMP proxy device may be checked firstly to determine whether there is any multicast host in the multicast host list. If there is one or more multicast hosts in the multicast host list, it should be then determined that whether the multicast data stream over the primary uplink is interrupted or whether the IGMP membership query message is received over the primary uplink at a predetermined interval; otherwise, the primary uplink is regarded as available.

Block 105: When the primary uplink is detected as unavailable, the IGMP proxy device may choose a new primary uplink from the standby uplinks according to the availabilities and priority levels of the standby uplinks, i.e., an available standby uplink with the highest priority level is the new primary uplink, and the IGMP proxy device then identifies the uplink as "primary" in the primary/standby identification field of the link control block corresponding to the uplink and modifies the primary/standby identification field of the link control block corresponding to the former primary uplink to identify the former primary uplink as "standby".

The method for choosing a new primary uplink from standby uplinks according to the availabilities and priority levels of the standby uplinks is similar to the method of choosing the primary uplink in Block 102, the only difference is that in Block 102 the primary uplink is chosen from all uplinks and in Block 105 the new primary uplink is chosen from standby uplinks. The process of choosing will not be described herein repeatedly.

Block 106: The IGMP proxy device sends an IGMP membership report message to the multicast source or multicast router over the new primary uplink to indicate that there are multicast hosts connected to the uplink so that the IGMP proxy device may receive the multicast packet and the IGMP membership query message over the new primary uplink.

In the embodiment, Block 106 is performed because the multicast source or multicast router in the prior art ceases sending the multicast packet and IGMP membership query message over an uplink through which no IGMP membership report message is received for a predetermined period of time. Therefore, if no IGMP membership report message is sent over an uplink, even if the uplink is the new primary uplink, the multicast source or multicast router may ignore the uplink, which results in data transmission interruption.

After performing Block 106, the IGMP proxy device returns to Block 103, i.e., uses the primary uplink and periodically checks the availability of the primary uplink, if the primary uplink is detected as unavailable, the IGMP proxy device chooses a new primary uplink.

Figure 2:
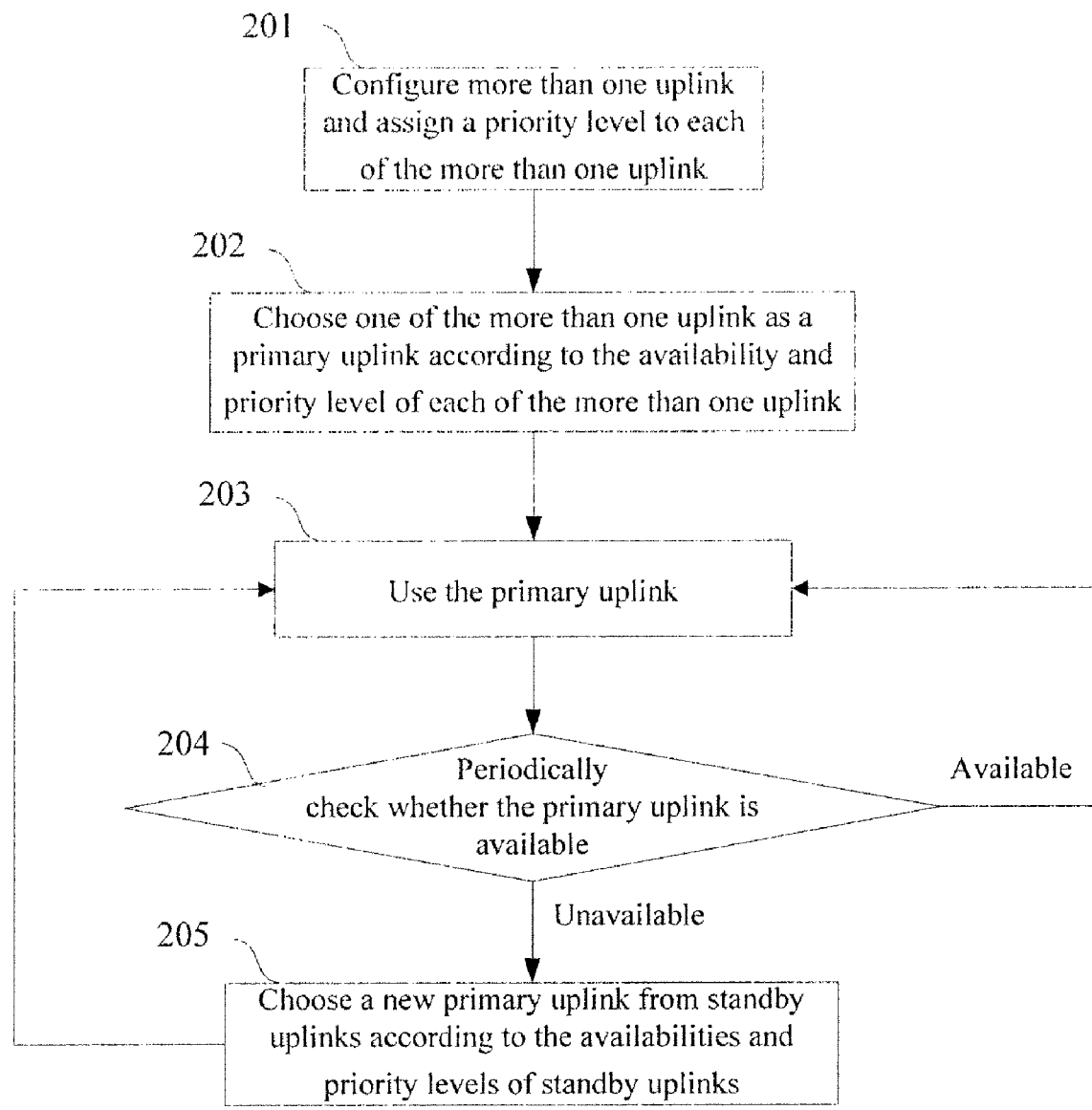
FIG. 2 shows a simplified flow chart illustrating a method for making uplink standby in accordance with another embodiment of the present invention.

FIG. 2 shows a simplified flow chart illustrating a method for making uplink standby in accordance with a second embodiment of the present invention, which includes as follows.

Blocks 201 to 202 are identical with Blocks 101 to 102 of the first embodiment.

Block 203: The IGMP proxy device sends the IGMP membership report message over both the primary uplink and the standby uplinks, and responds to the IGMP membership query messages received from both the primary uplink and the standby uplinks. However, only the multicast packet received by the IGMP proxy device over the primary uplink is replicated and sent over the downlink to a multicast host; the multicast packet received over the standby uplinks is discarded. The IGMP proxy device differentiates the primary uplink from the standby uplinks by checking the primary/standby identification field of the link control block corresponding to the uplink, and distinguishes an IGMP message from a multicast packet according an IP field in the IP header of the received packet. Therefore the IGMP proxy device may respond to protocol packets received over the standby uplinks while discarding the multicast packets received over the standby uplinks.

Blocks 204 to 206 are identical with Blocks 104 to 105 of the first embodiment.

After Block 205, the IGMP proxy device returns to the cycle of using the primary uplink, periodically checking the availability of the primary uplink, and if the primary uplink is detected as unavailable, choosing a new primary uplink.

A new primary uplink may also be chosen according to the availabilities and priority levels of the uplinks as described in the first embodiment while the primary uplink is in use in Block 103 of the first embodiment and Block 203 of the second embodiment, i.e., if the priority level of an available standby uplink is higher than the primary uplink, the standby uplink and the primary uplink is switched, the primary/standby identification field of the link identification block corresponding to the standby uplink is modified to identify the standby uplink as a new primary uplink, and the primary/standby identification field of the link identification block corresponding to the former primary uplink is modified to identify the former primary uplink as a standby uplink, thus a new primary uplink is chosen. The newly chosen primary uplink is put into use after Block 106 is performed in the first embodiment, or immediately in the second embodiment.

Practically, when an available standby uplink corresponds to a higher priority level than the primary uplink does, the standby uplink and the primary uplink may still remain the same without swapping, and the processes described in the first and second embodiments may also be performed unaffected.

The system administrator of the IGMP proxy device may also set on the IGMP proxy device an instruction for requiring choosing a new primary uplink, and the instruction may be launched at any time on demand. Upon the receipt of the instruction, the IGMP proxy device immediately performs Block 105 of the first embodiment or Block 205 of the second embodiment and initiates the process of choosing a new primary uplink.

In the embodiments herein there is only one IGMP proxy device between the multicast source or multicast router and the multicast host, however, when there are multiple IGMP proxy devices between the multicast source or multicast router and the multicast host, every IGMP proxy device may make uplink standby of its own with the method provided by the embodiments of the present invention.

The foregoing descriptions are only preferred embodiments of this invention and are not for use in limiting the protection scope thereof.

What is claimed is:

1. A method comprising:
   assigning a priority level to each of a plurality of uplinks that are configured for an Internet Group Management Protocol (IGMP) proxy device, wherein the uplinks comprise a primary uplink and at least one standby uplink;
   replicating, by the IGMP proxy device, a multicast packet received from the primary uplink and sending the multicast packet replicated over a downlink to a multicast host;
   checking the primary uplink periodically to determine whether an IGMP membership query message from a multicast source has been received on the primary uplink at a predetermined interval; and
   choosing a new primary uplink according to an availability and a priority level for each of the uplinks and designating the other uplinks as standby uplinks if the IGMP membership query message from a multicast source has not been received at the predetermined interval,
   wherein choosing a new primary uplink according to an availability and a priority level for each of the plurality of standby uplinks comprises one of:
   checking whether each of the plurality of standby uplinks is available, recording the priority level of a plurality of available standby uplinks, prioritizing the available uplinks, and choosing the available uplink with the highest priority level as a primary uplink; and
   arranging the plurality of standby uplinks according to the priority level of each of the standby uplinks, checking whether each of the standby uplinks is available according to an order of the priority level from high to low, and choosing the highest priority of the plurality of available standby uplinks as the primary uplink.

2. The method of claim 1, wherein checking whether each of the uplinks is available comprising:
   checking whether a bottom layer link of each of the uplinks is available.

3. The method of claim 1, wherein assigning the priority level to each of the uplinks comprises:
   assigning the priority level to each of the uplinks according to an idle bandwidth, or an interface type, or a delay of each of the uplinks, or according to a number of network devices through which each of the uplinks is connected to a multicast source or a multicast router, or according to whether each of the uplinks is a dedicated uplink or a common uplink.

4. The method of claim 1, further comprising:

sending, by the IGMP proxy device, an IGMP membership report message over the primary uplink and the standby uplinks, and responding to an IGMP membership query message received over the primary uplink and the standby uplinks.

5. The method of claim 1, further comprising: sending, by the IGMP proxy device, an IGMP membership report message over the primary uplink.

6. The method of claim 1, further comprising:

sending, by the IGMP proxy device, an IGMP membership report message over the primary uplink, and responding to an IGMP query received over the primary uplink.

7. The method of claim 1, further comprising:

setting a primary or a standby identification for each of the uplinks;

distinguishing, by the IGMP proxy device, the primary uplink from the standby uplinks according to the primary or standby identification.

8. The method of claim 1, further comprising: choosing the primary uplink according to the availabilities and priority levels of the uplinks and designating the other uplinks as standby uplinks prior to replicating by the IGMP proxy device.

9. An Internet Group Management Protocol (IGMP) proxy device, comprising:

a first module configured to replicate a multicast packet received over a primary uplink; wherein the primary uplink is one uplink chosen from a plurality of uplinks configured for the IGMP proxy device and the remaining uplinks are designated as standby uplinks;

a second module configured to send the multicast packet replicated by the first module over a downlink to a multicast host;

an assigning module configured to assign a priority level to each of the uplinks;

a third module configured to choose a new primary uplink from a plurality of standby uplinks according to the availability of the new primary uplink;

a fifth module configured to periodically check the primary uplink to determine whether an IGMP membership query message from a multicast source has been received from the primary uplink at a predetermined interval and, if the IGMP membership query message from a multicast source has not been received at a predetermined interval, start the third module, wherein the third module comprises:

a first sub-module configured to check whether each of the standby uplinks is available, record a priority level of each of a plurality of available standby uplinks, prioritize the available standby uplinks, and choose the available standby uplink with the highest priority level as the new primary uplink; or a second sub-module configured to arrange the plurality of standby uplinks according to the priority level of each of the standby uplinks, check whether each of the standby uplinks is available according to an order of the priority level from high to low, and choosing the highest priority of the plurality of available standby uplinks as the new primary uplink, wherein at least one of the first module, the second module, the third module, and the fifth module is located on a memory.

10. The IGMP proxy device of claim 9, further comprising:

a fourth module configured to check whether one of the standby uplinks has a higher priority level than the primary uplink when the primary uplink is in use, and if one of the standby uplinks has a higher priority level than the primary uplink, start the third module.

* * * * *